United States Patent [19]
Griffin et al.

[11] Patent Number: 5,126,011
[45] Date of Patent: Jun. 30, 1992

[54] PROCESS FOR THE PREPARATION OF HIGH PURITY CALCIUM TITANATE HYDRATES AND PRODUCT PRODUCED THEREBY

[75] Inventors: Richard C. Griffin, Mount Bethel; John Damiano, Easton, both of Pa.

[73] Assignee: Pfizer Inc., New York, N.Y.

[21] Appl. No.: 772,403

[22] Filed: Oct. 7, 1991

Related U.S. Application Data

[60] Division of Ser. No. 596,121, Oct. 11, 1990, Pat. No. 5,002,648, which is a continuation of Ser. No. 301,761, Jan. 26, 1989, abandoned.

[51] Int. Cl.$^5$ ............................................. D21H 19/36
[52] U.S. Cl. ................................. 162/135; 162/181.1; 162/181.2
[58] Field of Search .................. 162/135, 181.2, 181.1; 106/449, 436; 427/395

[56] References Cited

U.S. PATENT DOCUMENTS

| | | | |
|---|---|---|---|
| 1,436,164 | 11/1922 | Goldschmidt | 106/449 |
| 2,166,221 | 7/1939 | Patterson | 106/449 |
| 3,484,260 | 12/1969 | Emslie et al. | 162/181.2 |
| 4,173,485 | 11/1979 | Woditsch et al. | 106/449 |

*Primary Examiner*—Peter Chin
*Attorney, Agent, or Firm*—Peter C. Richardson; Lawrence C. Akers; Howard R. Jaeger

[57] ABSTRACT

A process for the preparation of high purity calcium titanate hydrates, particularly various forms of kassite, is disclosed. Calcium carbonate and titanium tetraisopropoxide are used as starting materials. The process utilizes a hydrothermal reaction step. Hydrates having both hexagonal form, wherein the particles have a platy morphology, and lath form, wherein the particles have a rodlike morphology are produceable according to the process. Particle morphology is determined by the choice of process parameters, especially the rate of heating during the hydrothermal reaction step. Kassite particles of the hexagonal plate form, which are useful as a high opacity paper coating pigment, are produced when the rate of heating is less than or equal to 1.5°C./min. Faster rates of heating result in kassite particles of a lath form. These particles are useful as a reinforcing material in polymers and ceramics.

2 Claims, No Drawings

PROCESS FOR THE PREPARATION OF HIGH PURITY CALCIUM TITANATE HYDRATES AND PRODUCT PRODUCED THEREBY

This is a division of application Ser. No. 596,121, filed on Oct. 11, 1990 which was a continuation of application Ser. No. 301,761, filed Jan. 26, 1989 now U.S. Pat. No. 5,002,648.

FIELD OF THE INVENTION

This invention relates to a process for the preparation of high purity calcium titanate hydrates, including both hexagonal and lath forms of kassite. The invention further relates to the production of high purity calcium titanate hydrates having a hexagonal or platelike particle morphology for use as a reinforcing material in polymers and ceramics and to the production of high purity calcium titanate hydrates having a lath or rodlike particle morphology for use as a high opacity paper coating pigment.

BACKGROUND OF THE INVENTION

Calcium carbonate and titania are each individually leading examples of white opacifiers in the field of pigmentary materials. The effects produced by these materials are due to the combined effects of a number of their physical properties, especially, particle size, morphology, and refractive index. Because these materials individually produce favorable results as opacifiers, it was decided to investigate whether the two compounds could be chemically combined in a way that produces synergistically greater benefits as an opacifier than either of the individual materials.

As a result of this research, it has been discovered that the two compounds can be chemically combined to produce high purity synthesized kassite, a calcium titanate hydrate. Kassite is known to occur naturally in trace quantities. The material was discovered in 1959 in the Kola Peninsula of the Soviet Union, but was not identified until 1965. In the U.S., small amounts of the mineral have been found at a quarry in Arkansas.

Mitsuhashi and Watanabe mentioned the formation of kassite at a temperature below 310° C. using hydrothermal techniques to prepare synthetic brookite from co-precipitates of $TiCl_4$ and $CaCl_2$ solutions (9 Mineralogical Journal 4, pp. 236–240, Oct. 1978). They did not, however, discuss the crystallographic structure of the kassite, disclose its existence in alternative forms having different crystal morphologies, or suggest its suitability as either a pigment or a reinforcing material.

Samples of naturally occurring kassite from the Arkansas site in the U.S. were reported by Evans and Dwornik to have the hexagonal shaped platy morphology (71 American Mineralogist 1045–1048, 1986). They did not report the alternative lath form, which presumably is not a naturally occurring form.

Rudashevskii et al. reported the synthesis of kassite, but with the presence of Na, Fe, Al and Si atoms in the crystal lattice structure and not as a high purity material as is prepared in accordance with the present invention. (Rudashevskii, L. S.; Firfarova, I. B.; and Tsekhovolskaya, D. I., 106 Zap. Vses. Mineral O. Va. (1) pp. 114–20, 1977). These authors, however, also did not disclose the crystallographic structure or physical properties of the kassite and did not disclose or suggest its utility, in the alternative pure hexagonal and lath forms, as a pigment and a reinforcing material, respectively.

It is well known to use particles having fibrous of rodlike crystal structures as reinforcing materials in plastics and ceramics. Heretofore, however, it has not been known to use a calcium titanate hydrate in this capacity. The present discovery of a method of preparing a form of kassite having the lath or rodlike morphology which renders it useful as a reinforcing material represents the discovery of a completely new form of material and a new use for this material.

It was noted initially that the product kassite has a hexagonal plate morphology. Because there are no particulates represented by this morphology in existing calcium carbonate and titania pigment product lines, it was recognized that kassite produced in this way has excellent potential as a new form of pigment.

There is a great need for laminar pigments in the filed of coating materials for such applications as paint finishes and paper coatings. Laminar pigments are utilized in these applications because they impart a high degree of surface smoothness. Laminar pigments are unique in that while thy have a novel particle morphology, they have a particle size distribution and exhibit a range of refractive index characteristic of white opacifying pigments.

Experiments to determine the optimum reaction conditions for reacting calcium carbonate and titania to produce the hexagonal form of kassite led to the production of a second form of the product having an alternative morphology. This new material, which we refer to as the "lath" form of kassite, was observed to have a fibrous or rodlike crystal structure.

SUMMARY OF THE INVENTION

According to the present invention, two different crystallographic forms a high purity (99.9% pure) calcium titanate hydroxide (kassite), having the chemical formula $CaTi_2O_4(OH)_2$ are prepared. The hexagonal or plate form has a flat hexagonal plate crystal structure which renders it highly useful as a pigment. The lath or rod form has a fibrous rodlike crystal structure which makes it an excellent reinforcing material for polymers and ceramics. The form of kassite produced is determined by the rate of heating during a hydrothermal reaction step which constitutes part of the present process for producing the kassite. Slower heating rates of under 1.5° C./min. result in kassite having the hexagonal crystal form while faster rates of heating, in excess of 1.5° C./min. result in kassite having the lath crystal form.

DETAILED DESCRIPTION OF THE INVENTION

Determination of the crystal structure of the two types of kassite that are produced according to the process of the present invention based on the rate of heating utilized in the hydrothermal reaction step of the process is made by X-ray diffraction, a variety of microscopy techniques and by visual inspection.

As crystals of calcium titanate hydroxide, both forms of kassite have certain definite crystallographic properties. The most useful properties for identifying purposes are the d-spacings which are inter-atomic crystal lattice distances which are readily determined by X-ray diffraction.

Determinations of d-spacings for a wide variety of inorganic crystal materials have been made by the International Center for Powder Diffraction Data of Inorgnic Phases and are kept in a set of card files which serve as a standard of measure of d-spacings for those materials. The d-spacings of naturally occurring kassite have been determined and are recorded at card #20-243.

X-ray diffraction measurements performed on samples of both forms of kassite produced in accordance with the process of this invention produced d-spacing measurements which were slightly shifted from the standard measurements recorded by the International Center. The shifts in the d-spacings were found to be attributable to the fact that the kassite produced by the present process is purer than the naturally occurring material, which contains contaminating atoms of Na, Fe, Al, and/or Si in the crystal lattice structure. The purity of the kassite produced according to the present process is a function of the amount of impurities in the calcium carbonate utilized.

Kassite produced according to the present process typically has a purity of at least 99.5%.

A typical composition, including impurities is:

|  | Weight % |
| --- | --- |
| $CaTi_2O_4(OH)_2$ | 99.666 |
| $MgCO_3$ | 0.26 |
| $SiO_2$ | 0.004 |
| $Al_2O_3$ | 0.04 |
| $Fe_2O_3$ | 0.03 |
|  | 100.00 |

Both the hexagonal and lath forms of kassite have an orthorhombic crystal structure. Both forms have the same d-spacings because the unit cell inter-atomic crystal distances are the same regardless of form. The differences in form arise from differences in the directions of growth of the planes of the crystals. Crystal growth in the hexagonal form kassite occurs only in the direction of a plane parallel to the edge of the hexagonal face of the crystal. That is, along the edge of the hexagonal crystal plate. In contrast, crystal growth in the lath form of kassite is principally in the direction of an axis perpendicular to the hexagonal plate face of the crystal, resulting in fibrous hexagonal rod like crystals having an aspect ratio (length: diameter) of around 20:1.

The particle size range of hexagonal form kassite is from 0.1 to 5 microns. The particle size range of lath form kassite is from 0.1 to 10 microns in length and from 0.005 to 0.65 microns in width, with aspect ratios of from 10:1 to 50:1, averaging around 20:1.

Determination of the crystallographic orientation of crystals of kassite is performed by one or more of the techniques of scanning electron microscopy (SEM) or transmission electron microscopy (TEM) and by visual inspection of the pattern of macroscopic crystal growth.

Determination of the atomic composition of crystals of kassite is performed by scanning/transmission electron microscopy (STEM) utilizing an analytical probe to determine the relative amounts of calcium and titanium atoms by doing an elemental analysis of a powdered sample of the crystal. This means of analysis is also a measure of the purity of the sample.

Alternative methods of crystallographic compositional analysis include electron diffraction scanning microscopy and the technique of X-ray fluorescence, useful for bulk elemental analysis.

Alkoxide chemistry is known to those skilled in the art as being a preferred synthesis route for producing high purity products. In the present case, the purity of the kassite product is further enhanced by the use of high purity precipitated calcium carbonate as a starting material.

The first part of the process for preparing kassite according to the present invention involves coating a high purity precipitated calcium carbonate with sufficient titanium hydroxide to meet the Ca:Ti stoichiometric requirements for kassite.

If the reaction is carried out solely in an aqueous environment, the resulting product is not kassite, but titania. Therefore, the amount of water used in the process must be carefully controlled. It has been discovered that this is best accomplished by the use of another solvent, preferably a $C_1$–$C_4$ alcohol and most preferably isopropyl alcohol. The amount of water utilized should be limited to only that which is necessary to produce the required hydration of the isopropoxide dispersion.

The first step in the process involves the formation of a first dispersion of calcium carbonate in a $C_1$–$C_4$ alcohol solvent. Preferably, isopropyl alcohol is used as the alcohol. A small amount of water is then added to the dispersion. This water binds to the surface of the calcium carbonate through the mechanism of hydroxyl bonding, a physical process.

A solution of titanium alkoxide is prepared by adding titanium alkoxide to a $C_1$–$C_4$ alcohol, preferably, isopropyl alcohol, at the desired concentration level.

A solution of water in a $C_1$–$C_4$ alcohol, preferably isopropyl, is prepared, at concentration levels equal to the prior titanium alkoxide solution, so as to fully hydrate the alkoxide when mixed together on a equal volume basis.

The water-alcohol solution is then added to the first calcium carbonate-alcohol dispersion. The titanium alkoxide-alcohol solution is then added to this dispersion. The presence of the required amount of water in the dispersion causes hydration of the titanium alkoxide, which also becomes bound to the calcium carbonate surface. This results in the formation of a second dispersion having larger sized particles.

The second dispersion is then filtered to remove alcohol, resulting in the formation of a filter cake. The filter cake is then washed with water, preferably distilled water.

A new, third dispersion is then formed from the washed filter cake by dispersing it in water. The water in this dispersion acts as a carrier for the calcium carbonate particles coated with the titanium alkoxide, and is subsequently utilized as a transport mechanism in the reactions of the hydrothermal step.

The subsequent hydrothermal treatment step is a means of achieving chemical reaction between a liquid solution and a solid phase crystal. Hydrothermal treatment is also a means for effecting the transport of ions in solution for crystal growth. Hydrothermal treatment is a known technique that allows reaction in an aqueous environment at temperatures above 100° C. without the occurrence of boiling of the aqueous solution. The hydrothermal treatment unit is a sealed pressurizable reactor which automatically raises the pressure to above the vapor pressure of water at a given reaction temperature. Materials which are ordinarily insoluble at low temperature can be made to undergo a solution forming reaction under the higher temperatures and elevated pressures attainable in a hydrothermal treatment unit.

Hydrothermal treatment enables the solubilizing, crystal-forming reaction of calcium carbonate and titanium hydroxide.

The third dispersion, formed from dissolving the filter cake of titanium alkoxide-coated calcium carbonate particles in water is charged to the hydrothermal treatment reactor unit at room temperature. The reactor unit is then sealed and heating is commenced.

Heat is supplied to the reactor to heat-up the material by circulating steam through coils in the reactor, or by electric heating coils. The material is heated from room temperature to a temperature in the range of from 300° C. to 330° C. over a period of up to three hours. When heat is supplied at a rate sufficient to produce a temperature increase in the material of less than or equal to 1.5° C./min., the resulting kassite product is of the hexagonal or platy form. When heat is supplied at a rate sufficient to produce a temperature increase in the material greater than 1.5° C./min., the resulting kassite product is of the lath form.

It is preferred that the material in the reactor not undergo stirring during the heating process, as it has been found that stirring of the reactants during hydrothermal treatment results in lower kassite yield.

Once formed, kassite itself, in either the hexagonal or the lath form, is only quasi stable. In order to fix its crystal structure, it is necessary to rapidly reduce the temperature of the material after hydrothermal treatment. The next process step, therefore, involves the rapid cooling of the kassite to fix the crystal structure and prevent its dissociation into calcium carbonate and titania. Cooling is best accomplished by circulating a heat absorbing fluid through a coil in the hydrothermal reaction unit. A typical cooling rate is on the order of a 200° C. temperature reduction over a period of 20 min.

Finally the cooled crystals are filtered and washed with water, preferably distilled water.

EXAMPLE 1

Preparation of Hexagonal Form Kassite

Precipitated calcium carbonate (15 g) was added to a beaker containing 250 ml. of 2-propanol. The calcium carbonate was dispersed by the application of sonication for 5 min. using an ultrasonic disruptor. When the calcium carbonate was fully dispersed, it was added to a reaction vessel. The total sample volume was then adjusted to 2.5 l. by the addition of 2-proponal. The sample was kept under constant agitation by mechanical stirring during this step and for the subsequent coating procedure.

Preparation of Coating Solutions

Coating solutions for coating the calcium carbonate were prepared as follows:
Solution A
Titanium isopropoxide solution (99.47 g) was added to a beaker containing 3325 ml. of 2-propanol. The resulting solution was manually stirred with a teflon spatula to cause complete mixing.
Solution B
Deionized water (114.91 g) was added to a beaker containing 3325 ml. of 2-propanol. The resulting solution was manually stirred with a teflon spatula to cause complete mixing.

Coating Step

Distilled water (13.5 g) was added to the calcium carbonate dispersion. After 5 min., a 250 ml. portion of solution B was added to the dispersion over a period of 20 min. After a further 5 min., a 250 ml. portion of solution A was added to the dispersion-solution B mixture over a period of 20 min. The resulting calcium carbonate-water-solution A - solution B dispersion was held for 15 min. before repeating the addition sequences of 250 ml. portions of solution B and solution A. This procedure was repeated until the entire amounts of solutions A and B were utilized.

The resulting coated dispersion was allowed to agitate for 4 hours after which it was filtered through a #5 Whatman filter paper in a Buchner funnel. The resulting filter cake was then washed with 10 volumes of distilled water. The washed filter cake was discharged into 200 ml. of distilled water in a 500 ml. beaker. The cake was manually reslurried using a teflon spatula.

Hydrothermal Reaction Step

The resulting slurry was placed in a hydrothermal pressure reaction vessel. The volume of the slurry was raised to 1.4 l. The temperature in the pressure reaction vessel was increased to a maximum 330° C., at a rate of from 1° to 1.5° C. per min. using an electrical heat source. When the peak temperature was reached, the heat source was turned off and the vessel was cooled as rapidly as possible by passing cooling water through internal cooling coils on the vessel. The vessel was cooled 200° C. in 20 minutes. The resulting sample of kassite was removed from the reaction vessel and filtered in a Buchner funnel through a #5 Whatman filter paper. The filter cake was removed from the Buchner funnel and allowed to air dry.

The product kassite was analyzed and found to be of the hexagonal form having orthorhombic crystals with a platy morphology and a particle size range of from 0.1 to 5 microns.

EXAMPLE 2

Preparation of Lath Form Kassite

The solution preparation and coating steps of Example 1 were identically repeated. The hydrothermal reaction step was repeated except that the temperature in the reaction vessel was raised to a maximum of 330° C. at a rate greater than 1.5° C. per min. The cooling and filtering steps were then performed after hydrothermal reaction identically as in Example 1.

The product kassite was analyzed and found to be of the lath form having orthorhombic crystals with a rod-like morphology. The particle size range was from 2 to 10 microns in length and from 0.01 to 0.3 microns in width. Particles had an average aspect ratio of greater than 20:1.

What is claimed is:

1. A method for producing high opacity paper comprising treating paper with a coating material containing hexagonal shaped crystal kassite pigment.

2. The method according to claim 1, wherein the hexagonal shaped crystal kassite pigment has a particle size in the range of from about 0.1 to about 5.0 microns.

* * * * *